US007193930B2

(12) United States Patent
Satoh et al.

(10) Patent No.: US 7,193,930 B2
(45) Date of Patent: Mar. 20, 2007

(54) QUANTITATIVE ECHO SOUNDER AND METHOD OF QUANTITATIVE SOUNDING OF FISH

(75) Inventors: Takanori Satoh, Nishinomiya (JP); Osamu Kubota, Nishinomiya (JP); Katsuhisa Yamamoto, Nishinomiya (JP); Satoshi Misonoo, Nishinomiya (JP); Youhei Kinoshita, Nishinomiya (JP); Yuriko Onishi, Nishinomiya (JP); Hiroyuki Toda, Nishinomiya (JP)

(73) Assignee: Furuno Electric Company, Ltd., Hyogo-ken (JP)

( * ) Notice: Subject to any disclaimer, the term of this patent is extended or adjusted under 35 U.S.C. 154(b) by 149 days.

(21) Appl. No.: 11/099,574

(22) Filed: Apr. 6, 2005

(65) Prior Publication Data
US 2005/0226099 A1    Oct. 13, 2005

(30) Foreign Application Priority Data
Apr. 7, 2004  (JP) ............................. 2004-113354

(51) Int. Cl.
*G01S 15/96* (2006.01)
(52) U.S. Cl. ....................................... 367/12
(58) Field of Classification Search ................. 367/12, 367/99
See application file for complete search history.

(56) References Cited

U.S. PATENT DOCUMENTS

2005/0226099 A1 * 10/2005 Satoh et al. .................. 367/99

FOREIGN PATENT DOCUMENTS

| GB | 2370355 A | 6/2002 |
|----|-----------|--------|
| JP | 149908 | 9/1982 |
| JP | 57204481 A | 12/1982 |
| JP | 19053 | 1/1993 |
| JP | 160522 | 6/1994 |
| JP | 06201818 A | 7/1994 |
| JP | 46946 | 2/2000 |

* cited by examiner

*Primary Examiner*—Dan Pihulic
(74) *Attorney, Agent, or Firm*—Birch, Stewart, Kolasch & Birch, LLP

(57) ABSTRACT

A quantitative echo sounder includes delay circuits, phase correction circuits, an incidence angle calculator and a directivity correction unit. The delay circuits adjust transmission start timing or phases of acoustic waves radiated by individual vibrating elements based on pitch and roll angles measured by a motion sensing device so that the direction of an acoustic axis of a transmitting beam matches a sounding direction. The phase correction circuits adjust phases of received echo signals based on the pitch and roll angles so that the direction of an acoustic axis of a receiving beam matches the sounding direction. The incidence angle calculator calculates echo signal incidence angle with respect to the sounding direction from phase differences among receiving beam signals obtained by four vibrating element groups. The directivity correction unit corrects a measured target strength by using the echo signal incidence angle calculated by the incidence angle calculator.

9 Claims, 7 Drawing Sheets

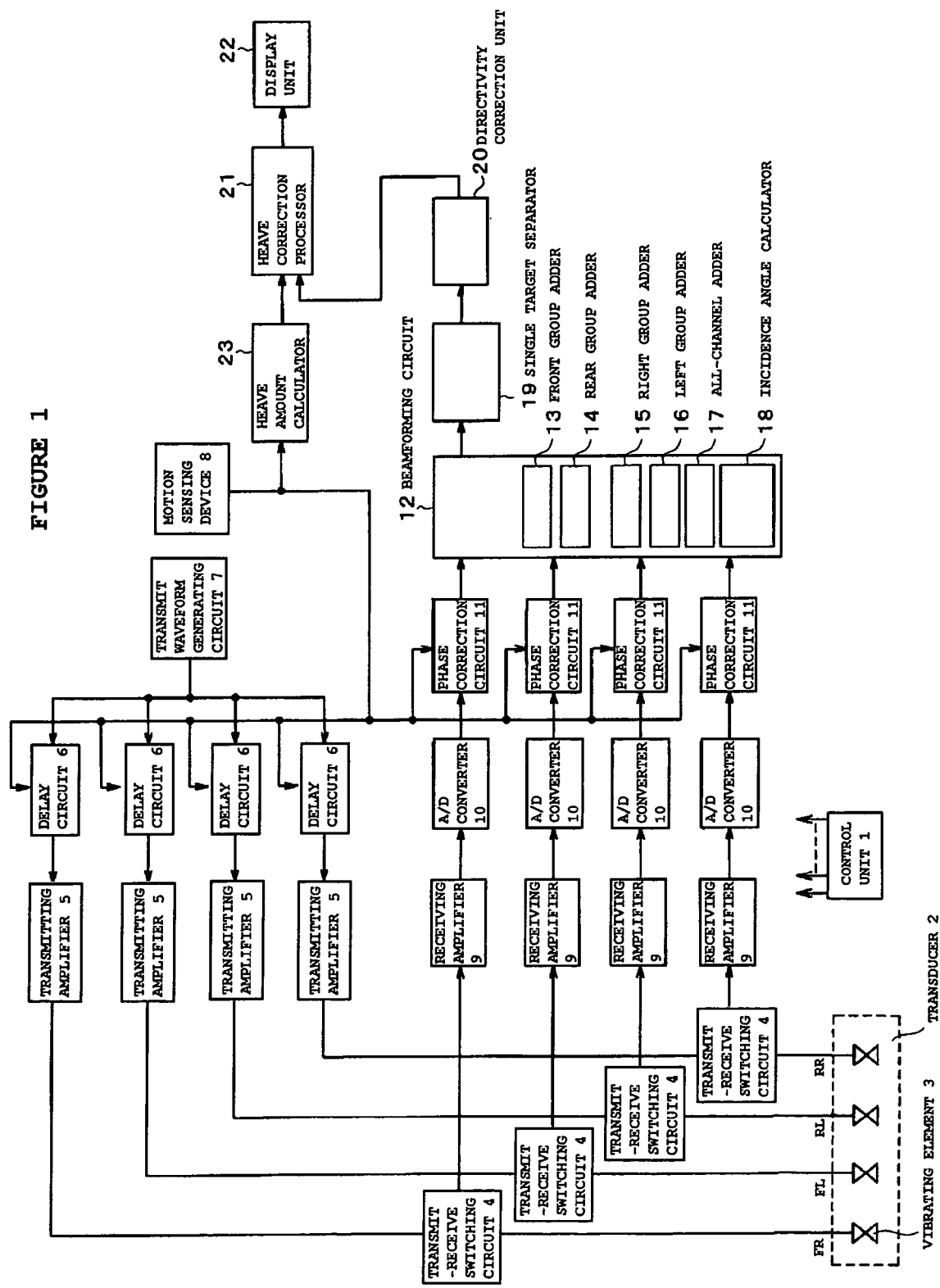

QUANTITATIVE ECHO SOUNDER AND METHOD OF QUANTITATIVE SOUNDING OF FISH

This Nonprovisional application claims priority under 35 U.S.C. § 119(a) on Patent Application No. JP 2004-113354 filed in Japan on Apr. 7, 2004, the entire contents of which are hereby incorporated by reference.

BACKGROUND OF THE INVENTION

1. Field of the Invention

The present invention relates to a split-beam type quantitative echo sounder and a method of split-beam type quantitative fish echo sounding.

2. Description of the Related Art

Today, a quantitative echo sounder capable of estimating the length of a single fish and the quantity of a fish school is an essential tool for surveys of fishery resources and efficient fishing operation. Generally, the quantitative echo sounder measures the length of a single fish based on the fact that target strength TS of the fish, which is defined as the ratio of the sound pressure level of an echo signal returned by the fish, or a target of measurement, back to a transducer to the sound pressure level of an incident ultrasonic (acoustic) sounding signal emitted from the transducer, is proportional to the square of the fish length. The transducer however has its own directional characteristics, so that the intensity of a sound wave emitted by the transducer and the receiving sensitivity thereof vary with the direction in which the sound wave is transmitted and from which the fish echo arrives. For this reason, the level of an echo signal received from one fish differs from that received from another fish even if those fishes have the same length. Therefore, if the location of a target fish is offset from the direction of an acoustic axis (or main lobe direction) of the transducer, the level of an echo signal received from the target fish is lower than would be received when the same target fish is located exactly on the acoustic axis. Such a deviation of the target fish from the acoustic axis of the transducer conventionally causes of a measurement error in quantitative fish echo sounding.

One previous approach to the solution of this kind of measurement error problem is found in Japanese Patent Application Publication No. 1994-160522. Specifically, this Publication proposes a method of correcting measurement errors as illustrated in FIGS. 8A–8C. According to the method of the Publication, a transducer is divided into four vibrating elements a–d as shown in FIG. 8A. When radiating a sine-wave acoustic sounding signal, all of the four vibrating elements a–d are excited in phase to together generate sound waves having sharp directivity oriented vertically downward. Upon receiving echo signals, a quantitative echo sounder calculates a phase difference $\phi_X$ between the echo signal received by the vibrating elements a, b and the echo signal received by the vibrating elements c, d and determines the angle of incidence $\theta_X$ that the direction of the incoming echo signal makes with the normal to an X-Z plane taking into account the distance L between a common center of gravity of the vibrating elements a, b and a common center of gravity of the vibrating elements c, d as depicted in FIG. 8B. Similarly, the quantitative echo sounder calculates a phase difference $\phi_Y$ between the echo signal received by the vibrating elements a, d and the echo signal received by the vibrating elements b, c and determines the angle of incidence $\theta_Y$ that the direction of the incoming echo signal makes with the normal to an Y-Z plane as depicted in FIG. 8C. The quantitative echo sounder corrects the level of the received echo signal by the incidence angles $\theta_X$, $\theta_Y$ to reduce measurement errors of the target strength TS. To eliminate uncertainty involved in determining the incidence angles $\theta_X$, $\theta_Y$, the aforementioned sine-wave acoustic sounding signal generated by the vibrating elements a–d is frequency-modulated by a sine wave of which frequency is lower than that of the sounding signal itself in this approach.

Another previous approach to the measurement error problem is found in Japanese Patent Application Publication No. 2000-46946. This Publication discloses a quantitative echo sounder employing a transducer including multiple vibrating elements (not shown) which are divided into three groups, that is, a front beam group, a rear-left beam group and a rear-right beam group, the vibrating elements of the three groups together forming a flat radiating surface as illustrated in FIG. 9. Each group includes a large number of vibrating elements to form a receiving beam having sharp directivity. The quantitative echo sounder detects a time difference between echo signals picked up by each pair of receiving beams, converts the time differences detected by individual pairs of receiving beams intersecting at 60 degrees in plan view into time differences which would be obtained if the receiving beams were arranged to intersect at right angles, and determines the angles of incidence of the echo signals from the converted time differences Although not intended for measuring the level of a received echo signal, another previous approach is found in Japanese Patent Application Publication No. 1982-149908, which discloses a depth sounder to be installed on a survey vessel for measuring water depths with an arrangement for reducing depth measuring errors caused by such motions of the survey vessel as pitching and rolling. By detecting pitch and roll angles of the survey vessel, this depth sounder controls the phases of acoustic signals transmitted and received by individual vibrating elements of a transducer in order to maintain the direction of an acoustic axis of the transducer vertically down.

Still another previous approach is proposed in Japanese Patent Application Publication No. 1993-19053, which discloses a depth sounder provided with a motion sensing device. By using information on pitch and roll angles and acceleration of a vessel output from the motion sensing device and the relationship between the location of a transducer and the location of the motion sensing device, the depth sounder determines displacement $\Delta h$ of the transducer in the vertical direction due to the vessel's motion caused by waves, for instance.

The method of correcting measurement errors proposed in Japanese Patent Application Publication No. 1994-160522 however has a problem that it is difficult to determine the target strength TS of a single fish when the vessel is in motion (pitches, rolls or heaves) due to waves or wind, for instance, because this method does not make it possible to freely vary the directions of transmitting and receiving beams to make up for movements of the vessel. Also, while the aforementioned Japanese Patent Application Publication No. 2000-46946 discloses an arrangement in which the transducer includes a large number of vibrating elements divided into three groups to form transmitting and receiving beams having sharp directivity, the transmitting and receiving beams are oriented in different directions under conditions where the vessel is in motion due to waves or wind, for instance. The difference in the directions of the transmitting and receiving beams produces a more conspicuous influence when the transmitting and receiving beams have sharper directivity. For this reason, there arises a problem that measurement errors increase if the target strength TS is corrected by the angles of incidence of the incoming echo signals determined based on the time differences among the echo signals picked up by the receiving beams formed by the individual vibrating element groups.

SUMMARY OF THE INVENTION

Intended to solve the aforementioned problems of the prior art, the present invention has as an object the provision of a split-beam type quantitative echo sounder and a method of split-beam type quantitative fish echo sounding which make it possible to carry out precise quantitative measurement of underwater targets even when a vessel is in motion due to waves or wind, for instance.

According to a principal feature of the invention, a split-beam type quantitative echo sounder has a capability to correct a measured target strength of an object by the angle of incidence of echo signals returned by the object. The quantitative echo sounder includes a transducer, a transmit signal regulator, a received signal regulator, an incidence angle calculator and a first target strength corrector. The transducer has a plurality of vibrating elements for radiating acoustic waves, the vibrating elements being arranged close to one another on a flat plane and divided at least into three groups, the centers of gravity of the three vibrating element groups being located not in line. The transmit signal regulator matches the direction of an acoustic axis of a transmitting beam with a predetermined sounding direction by adjusting transmission start timing or phases of the acoustic waves radiated by the individual vibrating elements based on pitch and roll angles measured at a moment of transmission start and the positions of the individual vibrating elements on the transducer. The received signal regulator matches the direction of an acoustic axis of a receiving beam with the sounding direction by adjusting phases of the echo signals received by the individual vibrating elements based on pitch and roll angles measured at a moment of receiving the echo signals and the positions of the individual vibrating elements on the transducer. The incidence angle calculator calculates the angle of incidence of the echo signals with respect to the sounding direction from phase differences between receiving beam signals formed from the phase-adjusted received echo signals obtained by at least one vibrating element group. The first target strength corrector corrects the measured target strength of the object based on the calculated incidence angle of the received echo signals.

The aforementioned transmit signal regulator, received signal regulator, incidence angle calculator and first target strength corrector correspond to delay circuits, phase correction circuits, an incidence angle calculator and a directivity correction unit which will be later described with reference to a specific embodiment of the invention. Part of functions of the delay circuits and the phase correction circuits, the directivity correction unit and the directivity correction unit may be performed by a control unit of the later described embodiment.

In the quantitative echo sounder thus structured, the direction of the acoustic axis of the transmitting beam always coincides with that of the receiving beam even under conditions where a vessel is in motion (pitches, rolls or heaves). The angle of incidence of the echo signals with respect to the sounding direction is calculated from the phase differences between the receiving beam signals formed from the received echo signals obtained by at least one vibrating element group, in which the received echo signals are adjusted in phase such that the direction of the acoustic axes of the transmitting and receiving beams coincide with the sounding direction. This arrangement makes it possible to correctly determine the angle of incidence of the echo signals and precisely measure the object even when the vessel is in motion. More specifically, the arrangement of the invention makes it possible to precisely determine the target strength of the object. In addition, since the quantitative echo sounder of the invention receives echo signals reflected by the top side (back) of fish regardless of whether the vessel is pitching or rolling if the sounding direction is vertically downward, it is possible to reduce variations in target strength measurements due to directional properties of the fish.

According to one aspect of the invention, the quantitative echo sounder further includes a second target strength corrector which calculates a first angle that the normal to a transmit-receive surface of the transducer makes with the sounding direction by using the pitch and roll angles measured at the moment of transmission start, calculates a second angle that the normal to the transmit-receive surface of the transducer makes with the sounding direction by using the pitch and roll angles measured at the moment of receiving the echo signals, and corrects the target strength based on the first and second angles.

In this structure, it is possible to obtain a more precisely calculated target strength of the object because the measured target strength is corrected based on the angle that the normal to the transmit-receive surface of the transducer makes with the sounding direction even when that angle fluctuates due to the motion of the vessel and the directional characteristics of the transmitting and receiving beams and the signal level vary.

According to another aspect of the invention, the quantitative echo sounder further includes means for calculating a first aperture area of the transmit-receive surface of the transducer as viewed along the sounding direction by using the pitch and roll angles measured at the moment of transmission start, varying the number of vibrating elements used for transmitting the acoustic waves in a manner that the first aperture area has a fixed value, calculating a second aperture area of the transmit-receive surface of the transducer as viewed along the sounding direction by using the pitch and roll angles measured at the moment of receiving the echo signals, and varying the number of vibrating elements used for receiving the echo signals in a manner that the second aperture area has a fixed value.

In this structure, it is possible to obtain a more precisely calculated target strength of the object because the directional characteristics of the transmitting and receiving beams and the signal level are kept constant even when the angle that the normal to the transmit-receive surface of the transducer makes with the sounding direction (and accordingly the aperture area of the transmit-receive surface of the transducer as viewed along the sounding direction) varies due to the motion of the vessel.

According to another aspect of the invention, the amount of adjustment of the transmission start timing or the phases of the acoustic waves and the amount of adjustment of the phases of the received echo signals are calculated from the scalar product of a vector indicating the sounding direction and position vectors of the individual vibrating elements corrected by the pitch and roll angles.

The quantitative echo sounder thus structured makes it possible to easily calculate the aforementioned amounts of adjustment even when the sounding direction is not vertically downward.

According to another aspect of the invention, the quantitative echo sounder further includes a display unit for displaying the location of the object detected, and means for determining the amount of displacement of the transducer from a reference position thereof in a vertical direction, wherein the location of the object along the vertical direction displayed on the display unit is corrected by the determined amount of displacement of the transducer.

The quantitative echo sounder thus structured offers improved visibility to an operator by displaying the object at a position (depth) free of up/down movements of the object even under conditions where the transducer moves up and down due to heaving of the vessel caused by waves, for instance. In addition, since the direction of the acoustic axes of the transmitting and receiving beams always coincide with the sounding direction even when the vessel is in motion, the quantitative echo sounder can make the aforementioned correction of the location of the object with much higher accuracy than the earlier-mentioned approach of Japanese Patent Application Publication No. 1993-19053.

According to another aspect of the invention, the quantitative echo sounder further includes means for varying the sounding direction which is a vertically downward direction or a direction inclined from the vertically downward direction by a specific angle.

The aforementioned means for varying the sounding direction corresponds to the control unit of the later described embodiment. This structure allows the quantitative echo sounder to sound targets in desired directions.

According to still another aspect of the invention, the quantitative echo sounder further includes a display unit for displaying the location of the object detected, and means for determining the amount of displacement of the transducer from a reference position thereof in a vertical direction, wherein the location of the object along the vertical direction displayed on the display unit is corrected by the determined amount of displacement of the transducer and the specific angle that the sounding direction makes with the vertically downward direction.

The quantitative echo sounder thus structured offers improved visibility to the operator by displaying the object at a position (depth) free of up/down movements of the object even under conditions where the transducer moves up and down due to heaving of the vessel caused by waves, for instance, and the sounding direction makes a specific angle with the vertically downward direction. In addition, since the direction of the acoustic axes of the transmitting and receiving beams always coincide with the sounding direction even when the vessel is in motion, the quantitative echo sounder can make the aforementioned correction of the location of the object with much higher accuracy than the earlier-mentioned approach of Japanese Patent Application Publication No. 1993-19053.

According to another principal feature of the invention, a method of split-beam type quantitative fish echo sounding by use of a transducer having a plurality of vibrating elements for radiating acoustic waves, the vibrating elements being arranged close to one another on a flat plane and divided at least into three groups, the centers of gravity of the three vibrating element groups being located not in line, in which a measured target strength of an object is corrected by the angle of incidence of echo signals returned by the object, includes the steps of matching the direction of an acoustic axis of a transmitting beam with a predetermined sounding direction by adjusting transmission start timing or phases of the acoustic waves radiated by the individual vibrating elements based on pitch and roll angles measured at a moment of transmission start and the positions of the individual vibrating elements on the transducer, matching the direction of an acoustic axis of a receiving beam with the sounding direction by adjusting phases of the echo signals received by the individual vibrating elements based on pitch and roll angles measured at a moment of receiving the echo signals and the positions of the individual vibrating elements on the transducer, calculating the angle of incidence of the echo signals with respect to the sounding direction from phase differences between receiving beam signals formed from the phase-adjusted received echo signals obtained by at least one vibrating element group, and correcting the measured target strength of the object based on the calculated incidence angle of the received echo signals.

In this method of split-beam type quantitative fish echo sounding, the direction of the acoustic axis of the transmitting beam always coincides with that of the receiving beam even under conditions where the vessel is in motion (pitches, rolls or heaves). The angle of incidence of the echo signals with respect to the sounding direction is calculated from the phase differences between the receiving beam signals formed from the received echo signals obtained by at least one vibrating element group, in which the received echo signals are adjusted in phase such that the direction of the acoustic axes of the transmitting and receiving beams coincide with the sounding direction. This method of quantitative fish echo sounding makes it possible to correctly determine the angle of incidence of the echo signals and precisely measure the object even when the vessel is in motion. More specifically, the method of the invention makes it possible to precisely determine the target strength of the object. In addition, since the method of the invention uses echo signals reflected by the top side (back) of fish regardless of whether the vessel is pitching or rolling if the sounding direction is vertically downward, it is possible to reduce variations in target strength measurements due to directional properties of the fish.

These and other objects, features and advantages of the invention will become more apparent upon reading the following detailed description in conjunction with the accompanying drawings.

BRIEF DESCRIPTION OF THE DRAWINGS

FIG. 1 is a block diagram generally showing the configuration of a quantitative echo sounder according to a specific embodiment of the invention;

DETAILED DESCRIPTION OF THE PREFERRED EMBODIMENTS OF THE INVENTION

A split-beam type quantitative echo sounder according to a specific embodiment of the present invention is now described with reference to FIGS. 1, 2A, 2B and 3. FIG. 1 is a block diagram generally showing the configuration of the quantitative echo sounder, FIGS. 2A and 2B are diagrams showing the structure of a transducer 2, and FIG. 3 is a diagram showing an XYZ coordinate system in which the transducer 2 is placed and a beam vector (sounding direction) thereof.

Figure 2A:
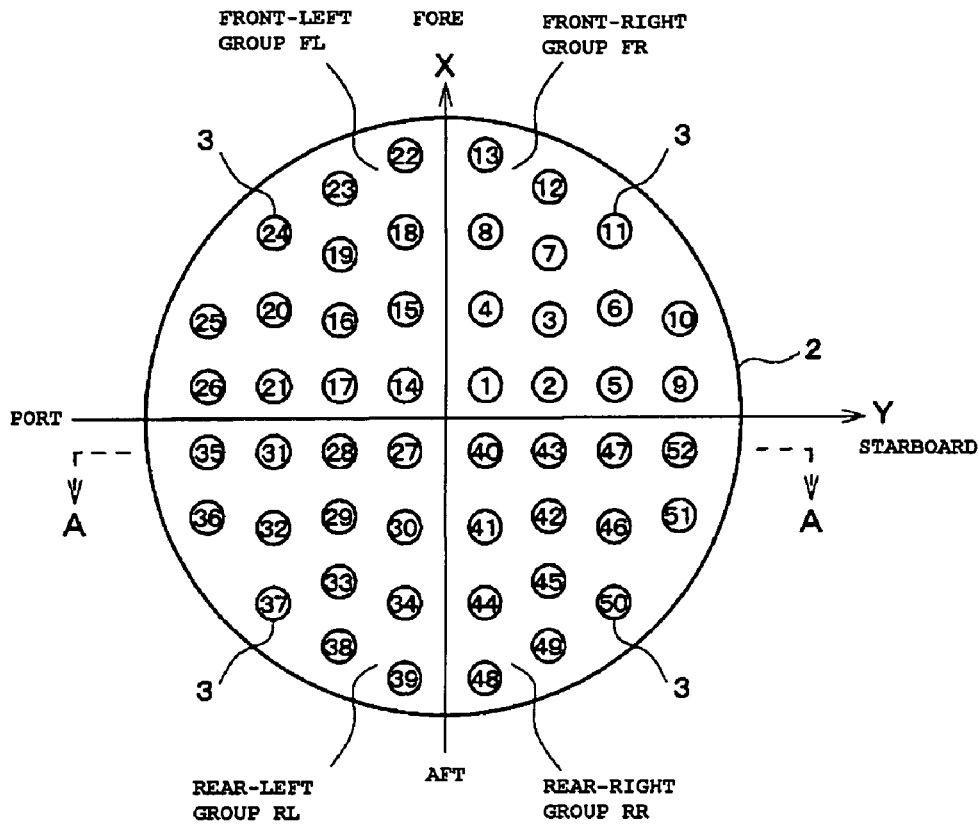
FIGS. 2A and 2B are diagrams showing the structure of a transducer of the quantitative echo sounder of FIG. 1.
Figure 2B:
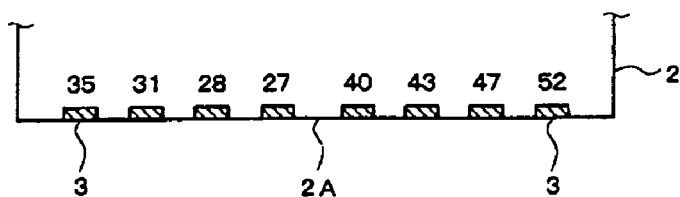

First, the structure of the transducer 2 is explained referring to FIGS. 2A and 2B. FIG. 2A is a plan view of the transducer 2 and FIG. 2B is sectional view of the transducer 2 taken along lines A—A of FIG. 2A. As can be seen from FIGS. 2A and 2B, the transducer 2 has a flat-shaped circular transmit-receive surface 2A on which a large number of vibrating elements (transmit-receive transducer elements) 3 are arranged. The numerals 1 to 52 encircled in FIG. 2A are numbers assigned to the individual vibrating elements 3. In the following discussion of the invention, the number "i" (or "ith") is used to identify any vibrating element 3.

As shown in FIG. 2A, the vibrating elements 3 are divided into four groups. Specifically, the vibrating elements 3 designated 1 to 13 together constitute a front-right group FR, the vibrating elements 3 designated 14 to 26 together constitute a front-left group FL, the vibrating elements 3 designated 27 to 39 together constitute a rear-left group RL, and the vibrating elements 3 designated 40 to 52 together constitute a rear-right group RR. Also, a combination of the front-right group FR and the front-left group FL is referred to as a "front group," a combination of the rear-right group RR and the rear-left group RL is referred to as a "rear group," a combination of the front-right group FR and the rear-right group RR is referred to as a "right group," and a combination of the front-left group FL and the rear-left group RL is referred to as a "left group."

Figure 3:
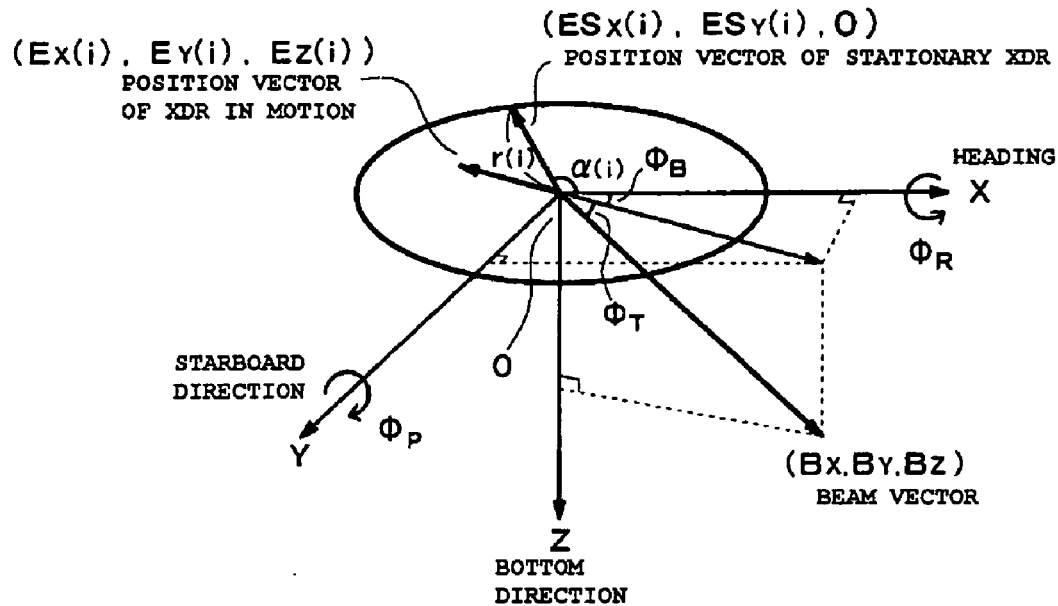
FIG. 3 is a diagram showing an XYZ coordinate system in which the transducer is placed and a beam vector (sounding direction) thereof.

Referring now to FIG. 3, the XYZ coordinate system applied to the transducer 2 and the beam vector (sounding direction) thereof are described in detail. The transducer 2 is placed in the XYZ coordinate system with the center of the transmit-receive surface 2A of the transducer 2 located at the origin O of the XYZ coordinate system, which is a space-fixed coordinate system that remains stationary even under conditions where the vessel is in motion (pitches, rolls or heaves) due to waves or wind, for instance. A positive direction of the X-axis of this coordinate system corresponds to the vessel's head direction, a positive direction of the Y-axis corresponds to the vessel's starboard direction, and a positive direction of the Z-axis corresponds to the vessel's port direction. Under conditions where the vessel is not in motion, the location of each vibrating element 3 is expressed by a position vector $(ES_X(i), ES_Y(i), 0)$ where the transmit-receive surface 2A of the transducer 2 is maintained in a horizontal position. As shown in FIG. 3, r(i) represents the distance between each vibrating element 3 and the origin O, and α(i) represents the angle that the positive direction of the X-axis makes with a line passing each vibrating element 3 and the origin O when the vessel is not in motion. These parameters, r(i) and α(i), are together referred to as position information of each vibrating element 3. Under conditions where the vessel is in motion, the location of each vibrating element 3 is expressed by a position vector $(ES_X(i), ES_Y(i), ES_Z(i))$. An ellipse, as illustrated in FIG. 3 for ease of recognition, represents a circle which bisects the ith vibrating element 3 when the vessel is not in motion.

The beam vector designated by $(B_X, B_Y, B_Z)$ in FIG. 3 is a unit vector pointing in the sounding direction. Further, $\phi_B$ designates the angular direction (bearing) of the beam vector and $\phi_T$ designates the tilt angle of the beam vector. As will be later described in detail, the quantitative echo sounder of this invention controls transmission and reception of acoustic waves in such a manner that acoustic axes of both transmitting beam and receiving beam coincide with the direction of the beam vector. Also, $\phi_R$ and $\phi_P$ shown in FIG. 3 are an instantaneous angle of roll and an instantaneous angle of pitch of the vessel, respectively.

Now, the configuration of the quantitative echo sounder (hereinafter referred to simply as the echo sounder) is described with reference to FIG. 1. It is to be noted that FIG. 1 shows only one of the 13 vibrating elements 3 of each of the vibrating element groups FR, FL, RL, RR and associated transmitting and receiving circuits. This means that the echo sounder actually includes 13 times larger numbers of the vibrating elements 3, delay circuits 6, transmitting amplifiers 5, transmit-receive switching circuits 4, receiving amplifiers 9, analog-to-digital (A/D) converters 10 and phase correction circuits 11 than depicted in FIG. 1. In the following discussion of the invention, the aforementioned transmitting and receiving circuits connected to the individual vibrating elements 3 are referred to as "transmit and receive channels."

A motion sensing device 8 is, for example, a GPS-based sensor system including a plurality of antennas for receiving signals of the Global Positioning System (GPS), a GPS attitude determining sensor and a GPS heave sensor connected to the individual GPS antennas. The GPS attitude determining sensor measures and outputs angles of pitch and roll of the vessel at regular intervals (e.g., 20 ms) while the GPS heave sensor measures and outputs the amount of heave (rise and fall along the Z-axis) of the GPS antennas at the same regular intervals. The pitch and roll angles output from the motion sensing device 8 are supplied to the delay circuits 6 and the phase correction circuits 11. By use of such a GPS-based sensor system, it is possible to configure the motion sensing device 8 at low manufacturing cost, yet offering improved measurement accuracy and reliability. The motion sensing device 8 used in this embodiment is not of any special design dedicated to the echo sounder of the invention but is of a type commercially available for use in navigational applications.

A control unit 1 including a central processing unit (CPU) and a memory controls individual parts of the echo sounder, such as the delay circuits 6 and the phase correction circuits 11 which will be later described. The bearing $\phi_B$ and the tilt angle $\phi_T$ of the beam vector are determined according to operator inputs fed through an operator panel (not shown) and stored in the memory of the control unit 1. The control unit 1 determines the beam vector by equation (1) below and sets parameters of the beam vector thus obtained in the delay circuits 6 and the phase correction circuits 11:

$$\{B_X, B_Y, B_Z\} = \{\cos(\phi_T)\cdot\cos(\phi_B), \cos(\phi_T)\cdot\sin(\phi_B), \sin(\phi_T)\} \quad (1)$$

Although the beam vector is normally expressed by a vector (0, 0, 1) directed vertically downward, it is possible to orient the beam vector in a desired sounding direction by altering the bearing $\phi_B$ and the tilt angle $\phi_T$ through the control unit 1. The position information r(i), α(i) of each vibrating element 3 stored as known data in the memory of the control unit 1 is also set in the corresponding delay circuit 6 and the phase correction circuit 11.

A transmit waveform generating circuit 7 generates a sine-wave transmit signal at a specific frequency (e.g., 38 kHz) and delivers this signal to the delay circuits 6 in the individual transmit channels. The transmit waveform generating circuit 7 outputs this transmit signal for a specific period of time (e.g., 0.3 ms) which is referred to as transmitting pulselength, during which the transducer 2 transmits a sounding signal underwater. After transmission, the echo sounder receives echo signals returned by underwater objects like fishes for a specific echo signal detection period. Upon completion of this echo signal detection period, the transmit waveform generating circuit 7 outputs the sine-wave transmit signal again to perform echo sounding operation in recurring cycles. Generally, the transmitting pulselength should preferably be short enough to ensure that echo signals from nearby fishes located in the same beam vector direction are distinguished from one another. If the transmitting pulselength is made too short, however, it is impossible to obtain a sufficient level (intensity) of echo signals necessary for target detection due to receiver system circuit characteristics. In this embodiment, the transmitting pulselength is set at an optimum value taking these points in consideration.

The delay circuits 6 introduce time delays in the transmit signal fed from the transmit waveform generating circuit 7 into the individual transmit channels to adjust transmission start timing of each channel so that the direction of the acoustic axis of the transmitting beam (or sounding beam) formed by the transducer 2 coincides with the beam vector direction even when the transmit-receive surface 2A of the transducer 2 is inclined with respect to the horizontal due to motion of the vessel. The transmit signals properly lagged by the delay circuits 6 according to a predetermined timing scheme are amplified by the transmitting amplifiers 5 and delivered through the transmit-receive switching circuits 4 to the respective vibrating elements 3 of the transducer 2, which radiates acoustic waves (sounding beam) underwater. The sounding beam whose acoustic axis coincides with the beam vector direction is radiated into the body of water to detect underwater objects existing in the beam direction. The transmit-receive switching circuits 4 alternately switches the signal channels between transmission and reception under the control of the control unit 1.

Now, the working of the delay circuits 6 is explained in detail. As already mentioned, the control unit 1 presets the parameters of the beam vector (refer to equation (1)) and the position information $r(i)$, $\alpha(i)$ of each vibrating element 3 in the corresponding delay circuit 6. In addition, the individual delay circuits 6 receive the pitch angle $\phi_P$ and the roll angle $\phi_R$ of the vessel from the aforementioned motion sensing device 8. Using these data, the delay circuits 6 calculate in-motion position vectors ($ES_X(i)$, $ES_Y(i)$, $ES_Z(i)$) of the individual vibrating elements 3 from equation (2) below:

$$\begin{bmatrix} Ex(i) \\ Ey(i) \\ Ez(i) \end{bmatrix} = \begin{bmatrix} 1 & 0 & 0 \\ 0 & \cos\phi_R & -\sin\phi_R \\ 0 & \sin\phi_R & \cos\phi_R \end{bmatrix} \begin{bmatrix} \cos\phi_P & 0 & -\sin\phi_P \\ 0 & 1 & 0 \\ \sin\phi_P & 0 & \cos\phi_P \end{bmatrix} \begin{bmatrix} r(i)\cdot\cos(\alpha(i)) \\ r(i)\cdot\sin(\alpha(i)) \\ 0 \end{bmatrix} \quad (2)$$

Figure 4:
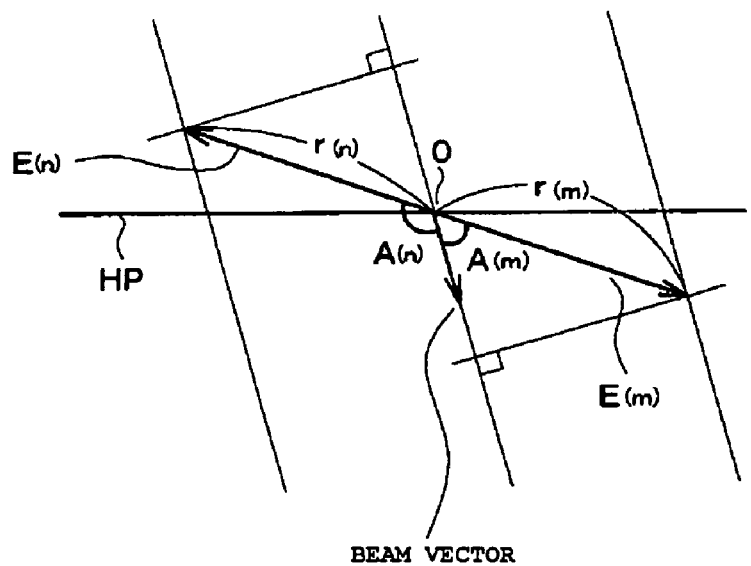
FIG. 4 is a diagram illustrating how time delays are introduced in individual transmit signals.

How the time delays introduced in the transmit signals are determined is now explained with reference to FIG. 4, in which designated by E(m) is the in-motion position vector of the mth vibrating element 3, designated by E(n) is the in-motion position vector of the nth vibrating element 3, designated by r(m) is the range from the origin O to the mth vibrating element 3, and designated by r(n) is the range from the origin O to the nth vibrating element 3. Also, designated by A(m) is the angle between the beam vector and the in-motion position vector E(m), designated by A(n) is the angle between the beam vector and the in-motion position vector E(n), and designated by HP is the horizontal plane. Neither the in-motion position vectors E(m) nor the in-motion position vectors E(n) lies on the horizontal plane HP due to motion of the vessel. To ensure that the direction of the acoustic axis of the sounding beam coincides with the beam vector direction in this condition, it is necessary to start transmission of acoustic waves from the mth vibrating element 3 at a timing lagged by a value obtained by dividing slant range $\{r(m)\cdot\cos(A(m))\}$ by the underwater sound velocity with respect to the origin O and to start transmission of acoustic waves from the nth vibrating element 3 at a timing lagged by a value obtained by dividing slant range $\{r(n)\cdot\cos(A(n))\}$ by the underwater sound velocity with respect to the origin O. Here, $\cos(A(m))$ has a positive value while $\cos(A(n))$ has a negative value.

Accordingly, the transmission start timing of the ith vibrating element 3 is retarded or advanced by $\{r(i)\cdot\cos(A(i))/(\text{sound velocity})\}$. As the beam vector is the unit vector, $\{r(i)\cdot\cos(A(i))\}$ is the scalar product of the in-motion position vector of the ith vibrating element 3 and the beam vector. The scalar product of two vectors is also the sum of products of X-, Y- and Z-components of the individual vectors. Therefore, the amount of adjustment of the transmission start timing of the ith channel is expressed by equation (3) below:

$$\text{Amount of adjustment} = \{E_X(i)\cdot B_X + E_Y(i)\cdot B_Y + E_Z(i)\cdot B_Z\}/(\text{sound velocity})\} \quad (3)$$

Each of the delay circuits 6 calculates the amount of adjustment of the transmission start timing by equation (3) above and adjusts the transmission start timing of the pertinent channel by the calculated amount of adjustment. In practice, the amount of adjustment of the channel of which transmission start timing should be most advanced is set to zero value and the transmission start timings of the other channels are all retarded. With this arrangement, the direction of the acoustic axis of the sounding beam transmitted by the transducer 2 coincides with the beam vector direction even under conditions where the vessel is in motion. When the transmission start timing is adjusted as explained above, the transmit signals transmitted through the individual channels are matched in phase in the beam vector direction.

Now, the receiver system of the echo sounder is described. Echo signals received by the vibrating elements 3 are fed into the receive channels through the transmit-receive switching circuits 4 and amplified by the respective receiving amplifiers 9. The amplified echo signals are passed through bandpass filters (not shown) which remove noise components existing outside a specific frequency band centering on the frequency of the transmit signal and converted into digital signals by the A/D converters 10. Each of the A/D converters 10 samples the echo signal at a first phase of an internal sine-wave signal having the same frequency as the frequency of the aforementioned transmit signal and at a second phase offset from the first phase by 90 degrees once per signal cycle. This sampling operation is hereinafter referred to as "IQ sampling." Also, the signal sampled at the first phase is referred to as "I signal," the signal sampled at the second phase is referred to as "Q signal," and I+jQ (where j is an imaginary unit) is referred to as "IQ signal."

The phase correction circuits 11 adjust the phases of IQ signals in such a fashion that the direction of the acoustic axis of the receiving beam coincides with the aforementioned beam vector even when the transmit-receive surface 2A of the transducer 2 is inclined with respect to the horizontal plane due to motion of the vessel. Based on the same concept as applied to the transmission timing adjustment, the amount of phase adjustment $\theta_C(i)$ of the echo signal of the ith channel with respect to the origin O is expressed by equation (4) below:

$$\theta_C(i) = \{E_X(i) \cdot B_X + E_Y(i) \cdot B_Y + E_Z(i) \cdot B_Z\} \cdot 2\pi/\lambda \quad (4)$$

where $\lambda$ is the wavelength of the transmit signal.

The phase is retarded when $\theta_C(i)$ is positive, and the phase is advanced when $\theta_C(i)$ is negative. The frequency (wavelength) of the transmit signal is determined such that the absolute value of equation (4) (refer to equation (2)) does not exceed $\pi$ if the pitch angle $\phi_P$ and the roll angle $\phi_R$ do not exceed a specific value (or within a measurable range of the present echo sounder).

The aforementioned phase adjustment operation is performed by multiplying the IQ signal of each channel by exp$(-j\theta c(i))$. This adjustment is done on a series of IQ signals obtained per channel during an echo receiving period (echo signal detection period). The IQ signals thus adjusted are referred to as corrected IQ signals. Each of the phase correction circuits 11 calculates the amount of phase adjustment $\theta_C(i)$ by equation (4) above and adjusts the phase of the IQ signal of each channel with the amount of phase adjustment $\theta_C(i)$ calculated per channel.

When calculating the amount of phase adjustment $\theta_C(i)$, each of the phase correction circuits 11 uses the latest pitch angle $\phi_P$ and roll angle $\phi_R$ fed from the motion sensing device 8. This is because a long period of time (e.g., 1 second) is needed after transmission of acoustic waves until an echo signal is received from a target fish located at a long distance (e.g., 750 m), and measuring errors would increase without the use of the latest pitch angle $\phi_P$ and roll angle $\phi_R$.

A beamforming circuit 12 adds the corrected IQ signals of the individual channels to form four receiving beam signals. Specifically, the beamforming circuit 12 includes a front group adder 13 for adding the corrected IQ signals of the channels detected by the 26 front group vibrating elements 3, a rear group adder 14 for adding the corrected IQ signals of the channels detected by the 26 rear group vibrating elements 3, a right group adder 15 for adding the corrected IQ signals of the channels detected by the 26 right group vibrating elements 3, and a left group adder 16 for adding the corrected IQ signals of the channels detected by the 26 left group vibrating elements 3. With the beamforming circuit 12 thus configured, the individual adders 13, 14, 15, 16 outputs four receiving beam signals. The beamforming circuit 12 further includes an all-channel adder 17 which adds the corrected IQ signals of all of the 52 channels and calculates by equation (5) below a signal level LV (hereinafter referred to as the echo signal level LV) of a beam IQ signal $(I_A+jQ_A)$ which is the result of addition:

$$LV = \sqrt{I_A^2 + Q_A^2} \quad (5)$$

The beamforming circuit 12 further includes an incidence angle calculator 18 for calculating the angle of incidence of the echo signals. When a fish, or a target of measurement, is located in a direction different from the beam vector direction, the echo signals of the individual channels can not be matched in phase even if their phases are corrected by the phase correction circuits 11. The incidence angle calculator 18 determines the angle of incidence of the echo signals by using phase differences of the echo signals. First, the incidence angle calculator 18 calculates a phase difference $\alpha_{BF}$ in a fore-aft direction and a phase difference $\alpha_{RL}$ in a left-right direction by equations (6) and (7) below, respectively:

$$\alpha_{BF} = \tan^{-1}(Q_F/I_F) - \tan^{-1}(Q_B/I_B) \quad (6)$$

$$\alpha_{RL} = \tan^{-1}(Q_L/I_L) - \tan^{-1}(Q_R/I_R) \quad (7)$$

where the subscripts F, B, R and L denote a front beam IQ signal, a rear beam IQ signal, a right beam IQ signal and a left beam IQ signal, respectively.

Figure 5:
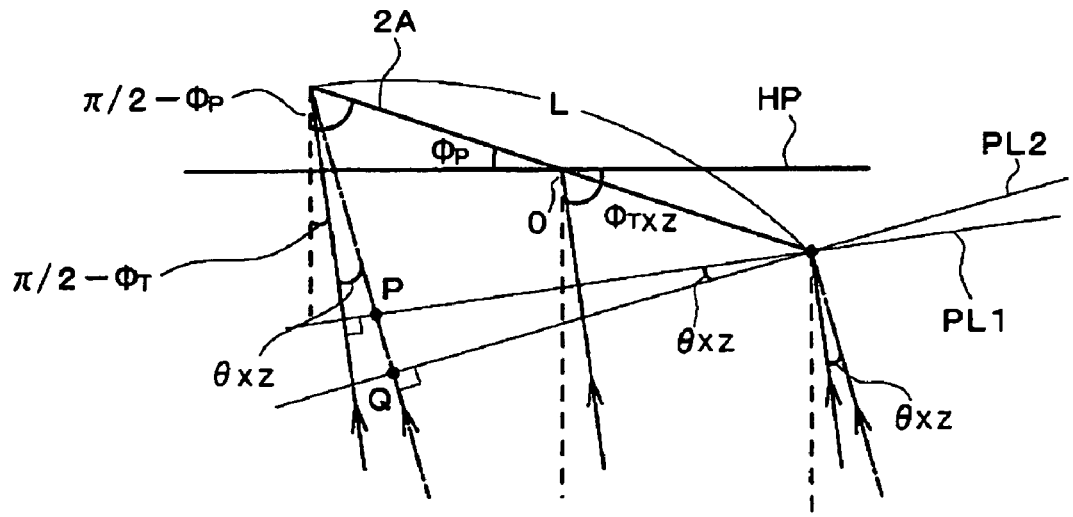
FIG. 5 is a diagram illustrating the angle of incidence of echo signals.

Next, the incidence angle calculator 18 calculates the angle of incidence of the echo signals with respect to the beam vector direction from the phase difference $\alpha_{BF}$ in the fore-aft direction and the phase difference $\alpha_{RL}$ in the left-right direction. FIG. 5 is a diagram showing an XZ incidence angle $\theta_{XZ}$ obtained by projecting the angle of incidence of the echo signals on an XZ plane, in which designated by HP is the horizontal plane and designated by L is the distance between the centers of gravity of the front and rear group vibrating elements 3. The transmit-receive surface 2A is inclined with respect to the horizontal plane. In FIG. 5, solid lines with arrows indicate the beam vector direction, alternate long and short dashed lines with arrows indicate the direction of the incident echo signals, and broken lines indicate the vertical direction. Also, PL1 indicates a plane perpendicular to the beam vector direction and PL2 indicates a plane perpendicular to the angle of incidence of the echo signals. As the echo signals arrive from the incident echo direction shown by the alternate long and short dashed lines with arrows, there is a phase difference between the front beam IQ signal and the rear beam IQ signal by an amount corresponding to a distance PQ.

Given a positional relationship shown in FIG. 5, the XZ incidence angle $\theta_{XZ}$ is expressed by equation (8) below. Similarly, a YZ incidence angle $\theta_{YZ}$ obtained by projecting the angle of incidence of the echo signals on an YZ plane is expressed by equation (9) below. Thus, the XZ incidence angle $\theta_{XZ}$ and the YZ incidence angle $\theta_{YZ}$ are calculated by these equations (8) and (9) as follows:

$$L \sin(\phi_{TXZ} - \phi_P - \theta_{XZ})\tan\theta_{XZ} = \lambda \cdot \alpha_{BF}/2\pi \quad (8)$$

$$L \sin(\phi_{TYZ} - \phi_R - \theta_{YZ})\tan\theta_{YZ} = \lambda \cdot \alpha_{RL}/2\pi \quad (9)$$

The angle $\phi_{TXZ}$ is the angle of a vector obtained by projecting the beam vector on an XZ plane with respect to the X-axis.

Also the angle $\phi_{TYZ}$ is the angle of a vector obtained by projecting the beam vector on an YZ plane with respect to the Y-axis.

The XZ incidence angle and the YZ incidence angle can also be calculated by these equations (8') and (9') as follows:

$$L \sin(\phi_{TXZ} - \phi_P - \theta_{XZ})\tan\theta_{XZ} = \lambda_{XZ} \cdot \alpha_{BF}/2\pi \quad (8')$$

$$L \sin(\phi_{TYZ} - \phi_R - \theta_{YZ})\tan\theta_{YZ} = \lambda_{YZ} \cdot \alpha_{RL}/2\pi \quad (9')$$

In these equations, $\lambda_{XZ}$ is obtained by projecting the wavelength on an XZ plane and $\lambda_{YZ}$ is obtained by projecting the wavelength on an YZ plane.

The incidence angle calculator 18 calculates the incidence angles ($\theta_{XZ}$, $\theta_{YZ}$) of the echo signals from the phase differences ($\alpha_{BF}$, $\alpha_{RL}$) between the receiving beam signals formed from the corrected IQ signals of which phases are adjusted by the phase correction circuits 11 in the aforementioned manner.

A single target separator 19 extracts data on a single fish from the echo signal level LV calculated by the beamforming circuit 12. While this single fish data gives a signal which successively varies from one sampling timing to next of the A/D converters 10, the data is shown in an envelope in FIG. 6.

Figure 6:
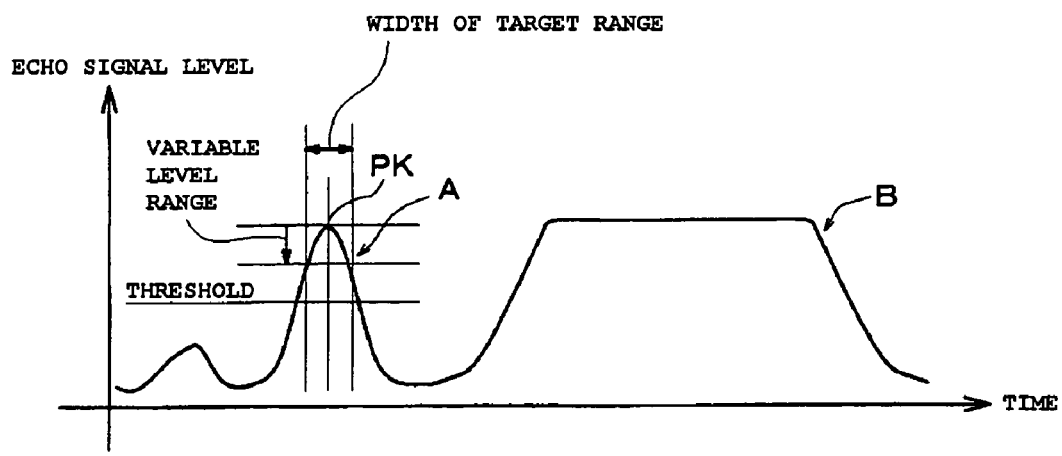
FIG. 6 is a diagram illustrating how data on a single fish is separated from the echo signals.

The echo signal level LV plotted on or below a "threshold" in FIG. 6 comes from noise or echo signals from small fishes which are not regarded as targets of fish length measurement, and the echo signal level LV plotted above the threshold level represents target fishes of which lengths are to be calculated. In FIG. 6, "width of target range" represents a time range during which the echo signal level LV exceeds the threshold level and is within a "variable level range" between a peak value PK and a level lower than the peak value PK by a specific amount (e.g., 6 dB).

In order to determine that an echo signal is caused by reflection from a single fish, the "width of target range", must generally equal to the pulselength of the aforementioned transmit signal (as shown in a portion "A" of FIG. 6). If there exist a plurality of fishes within a relatively short distance from the transducer 2, echo signals from those fishes overlap in part, so that the detected "width of target range" becomes larger than the pulselength of the transmit signal (as shown in a portion "B" of FIG. 6). Therefore, the "width of target range" must satisfy inequality (10) in order for any echo signal to be judged as being caused by reflection from a single fish:

(number of minimum sampling points) ∗ (sampling period) < (10)

(width of target range) <

(number of maximum sampling points) ∗ (sampling period)

In a case where N cycles (periods) of a sine wave radiated and a returning echo signal is IQ-sampled per period, for example, the number of minimum sampling points is 2N−4 and the number of maximum sampling points is 2N+4. Here, the aforementioned "variable level range" and the numbers of minimum and maximum sampling points are determined in consideration of such parameters as the frequency of the transmit signal and rising edge and falling edge characteristics of the bandpass filters.

The single target separator 19 obtains peak value of the echo signal level LV which satisfies conditions for determining that the echo signal is caused by reflection from a single fish in the above-described manner, and delivers data on the peak value and incidence angle data ($\theta_{XZ}$ and $\theta_{YZ}$) corresponding to the peak value to a directivity correction unit 20.

The directivity correction unit 20 corrects the echo signal level LV by using the incidence angle data ($\theta_{XZ}$ and $\theta_{YZ}$) for instance, to thereby calculate target strength TS. This operation of the directivity correction unit 20 is hereinafter referred to as "correction of the target strength TS." The target strength TS is calculated from each (single fish) echo signal level LV which is judged to have caused by reflection from a single fish by equation (11) below:

$$TS = 20 \log_{10}(LV) - G - Me - SL + TVG + B + Ct + Cr \quad (11)$$

where the second to eighth terms (G, Me, etc.) of the right side of equation (11) are also logarithmic values.

In equation (11) above, G is receiver gain which corresponds to the amplification factor of each receiving amplifier 9, and Me is a response to received sound pressure which is the response of each vibrating element 3 relative to a reference response (standard response). SL represents source level which is the level a transmitted acoustic signal relative to a reference level. TVG stands for time varied gain which is a receiver gain factor determined in relation to the time elapsed from transmission of acoustic waves to reception of return echoes (corresponding to the distance between the transducer 2 and fish). The target strength TS is corrected by the receiver gain G, the received sound pressure response Me, the source level SL and the time varied gain TVG as mentioned above, so that fishes of the same size will have the same target strength TS as calculated regardless of capabilities of transmitter and receiver systems or the distances between the transducer 2 and the individual fishes.

Represented by B in equation (11) is a transmit-receive directivity correction factor which is expressed by equation (12) below:

$$B = g_3 P^3 + g_2 P^2 + g_1 P \quad (12)$$

$$P = \sqrt{\theta_{XZ}^2 + \theta_{YZ}^2} \quad (13)$$

where $g_3$, $g_2$ and $g_1$ are coefficients predetermined from directional characteristics of the transducer 2.

The echo signal level LV decreases as the incidence angle ($\theta_{XZ}$, $\theta_{YZ}$) that the echo signal makes with the beam vector increases. Thus, the target strength TS is corrected by the transmit-receive directivity correction factor B of which value increases as the incidence angle ($\theta_{XZ}$, $\theta_{YZ}$) increases, so that the measured target strength TS of a given target has the same value regardless of the incidence angle ($\theta_{XZ}$, $\theta_{YZ}$). Although a technique of correcting the target strength TS by the incidence angle of the echo signal is conventionally known (as shown in Japanese Patent Application Publication No. 1994-160522, for example), the above-described approach of the present invention differs from the conventional approach in that the pitch angle $\phi_P$ and the roll angle $\phi_R$ are taken into account in calculating the echo signal incidence angle ($\theta_{XZ}$, $\theta_{YZ}$) (refer to equations (8) and (9)). It is therefore possible to precisely calculate the target strength TS even when the vessel is in motion.

Figure 7:
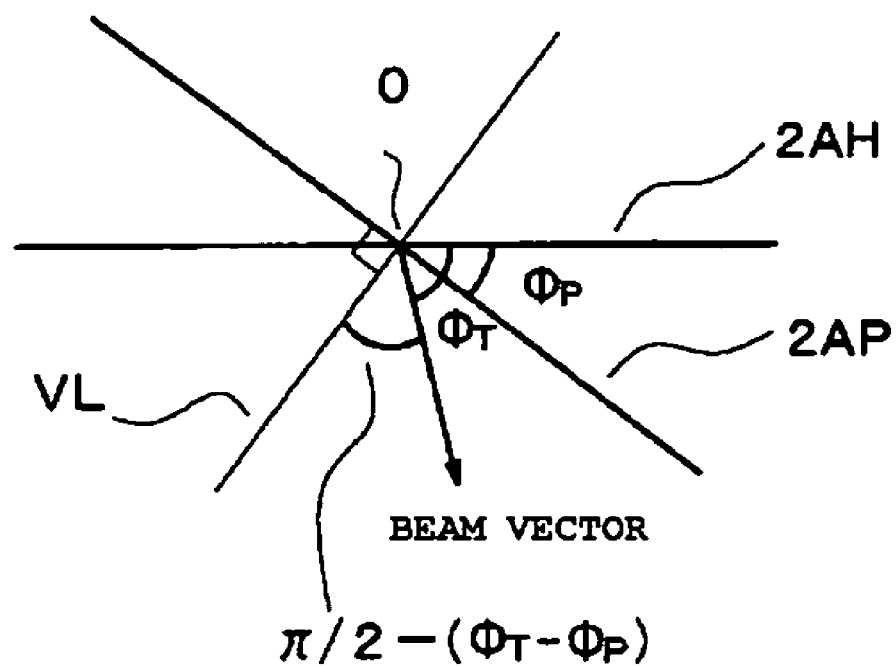
FIG. 7 is a diagram illustrating a relationship between the beam vector and the normal to a transmit-receive surface of the transducer.
Figure 8A:
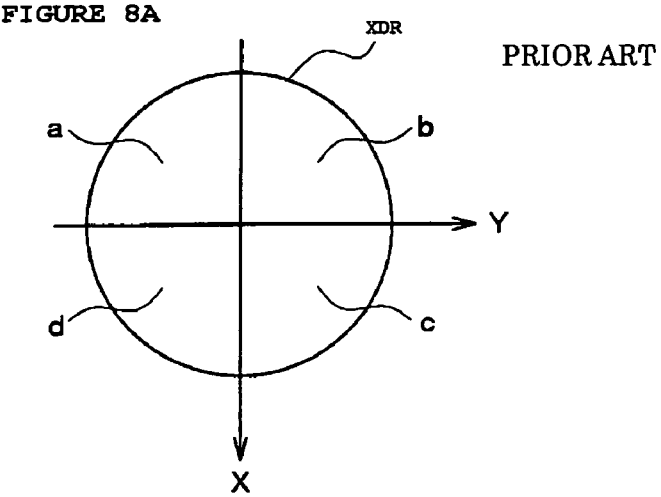
FIGS. 8A–8C are diagrams showing a principle of correcting measurement errors employed in a conventional split-beam type quantitative echo sounder.
Figure 8B:
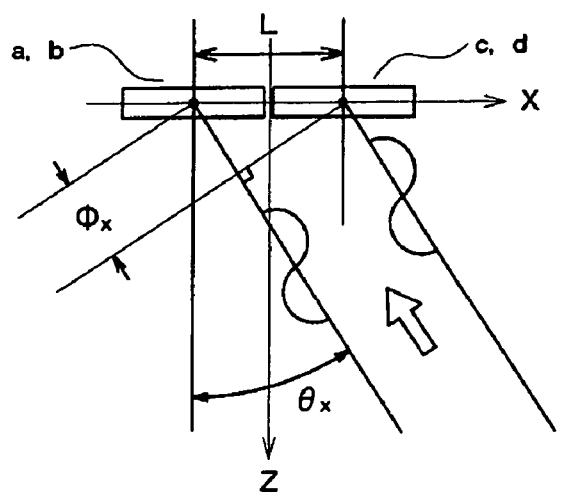
Figure 8C:
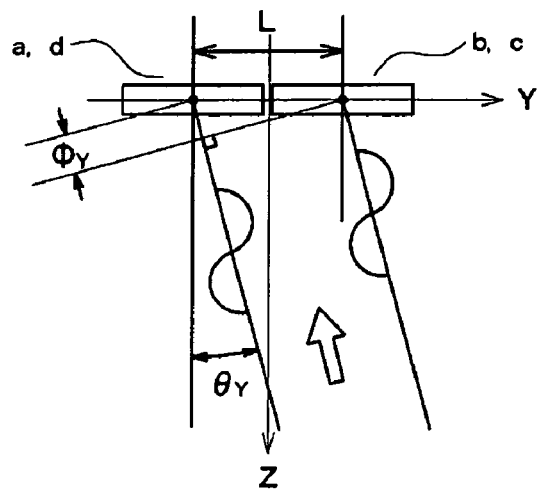

Represented by Ct in equation (11) is a correction factor used for correcting for variations in aperture area of the transmit-receive surface 2A of the transducer 2 with changes in the beam vector direction at transmission. This correction factor Ct is hereinafter referred to as the transmit directivity aperture area correction factor Ct. First, transmitting characteristics of the transducer 2 are discussed. (The same discussion applies to receiving characteristics of the transducer 2 as well.) The aperture area of the transmit-receive surface 2A of the transducer 2 as viewed along the beam vector direction is maximized, the directivity of the transmitting beam is most sharpened and the transmitting beam has a maximum signal level when the beam vector direction coincides with the normal to the transmit-receive surface 2A of the transducer 2 (such as when the transmit-receive surface 2A of the transducer 2 is horizontal and the beam vector direction is vertically downward). When the vessel pitches or rolls, however, the transmit-receive surface 2A of the transducer 2 becomes inclined with respect to the horizontal plane and the aperture area of the transducer 2 as viewed along the beam vector direction decreases accordingly. As a result, the directivity of the transmitting beam becomes widened and the signal level of the transmitting beam lowers. FIG. 7 is a diagram illustrating a relationship between the beam vector and the normal to the transmit-receive surface 2A of the transducer 2, in which 2AH indicates the transmit-receive surface 2A as it is in the horizontal position, 2AP indicates the transmit-receive surface 2A as it is inclined from the horizontal by the pitch angle $\phi_P$, and VL indicates the normal to the transmit-receive surface 2AP inclined by the pitch angle $\phi_P$. There exists a similar relationship as illustrated in FIG. 7 with respect to the roll angle $\phi_R$ as well.

To precisely determine the target strength TS even when acoustic waves are transmitted under conditions where the vessel is in motion, it is necessary to correct the measured target strength TS for variations in the aperture area of the transducer 2. What is used for making this correction is the above-described transmit directivity aperture area correction factor Ct which is expressed by equation (14) below:

$$Ct = h_2 S^2 + h_1 S \quad (14)$$

$$Ct = \sqrt{(\pi/2 - \phi_T + \phi_P)^2 + (\pi/2 - \phi_T + \phi_R)^2} \quad (15)$$

where equation (14) and coefficients $h_1$ and $h_2$ are experimentally obtained beforehand. When the beam vector is oriented vertically downward (i.e., $\phi_T = \pi/2$), equation (15) is rewritten as $\sqrt{\phi_P^2 + \phi_R^2}$.

Represented by Cr in equation (11) is a correction factor corresponding to the aforementioned transmit directivity aperture area correction factor Ct used when the echo sounder receives echo signals. This correction factor Cr is hereinafter referred to as the receive directivity aperture area correction factor Cr. Thus, the receive directivity aperture area correction factor Cr is also expressed by equation (14) above. When the echo sounder receives the echo signals, however, the pitch angle $\phi_P$ and the roll angle $\phi_R$ are not the same as those at the point of transmission of the acoustic waves, so that the receive directivity aperture area correction factor Cr has a different value from the transmit directivity aperture area correction factor Ct when the vessel pitches or rolls.

The directivity correction unit 20 carries out the aforementioned equations (12) to (15) and calculates the target strength TS by equation (11). Then, the directivity correction unit 20 calculates the length FL of a single fish from the target strength TS. It is known that there is a relationship expressed by equation (16) below between the target strength TS and the fish length FL:

$$FL = 20 \log FL + 10 \log K \quad (16)$$

where K is a coefficient determined by the frequency of the transmit signal and fish species.

When the purpose of a survey is to determine the quantity of a fish school and not the length FL of a single fish, the echo sounder is controlled to determine the quantity of the fish school from the echo signal level LV shown in FIG. 6 without performing the aforementioned operation for separating, or extracting, data on a single fish and to calculate the target strength TS of the single fish unaffected by the echo signal incidence angle ($\theta_{XZ}$, $\theta_{YZ}$) or the vessel's motion by correcting the echo signal level LV by equation (11). Also, the echo sounder calculates the position of the single fish or the fish school from the time elapsed from transmission of acoustic waves to reception of return echoes, the beam vector direction and the echo signal incidence angle ($\theta_{XZ}$, $\theta_{YZ}$). Data on the position and the length FL of the single fish, or on the position and quantity of the fish school are sent to a heave correction processor 21.

A heave amount calculator 23 stores previously obtained data on a positional relationship between the transducer 2 and the motion sensing device 8 as well as a reference position of the motion sensing device 8, or a vertical position of the motion sensing device 8 when the vessel does not heave (in the absence of waves). The heave amount calculator 23 calculates the amount of displacement Δh of the transducer 2 from a reference position thereof in a vertical direction caused by waves, for instance, from the aforementioned data preset in the heave amount calculator 23 and the pitch angle $\phi_P$, the roll angle $\phi_R$ and the amount of heave output from the motion sensing device 8.

The heave correction processor 21 corrects the position, or depth, of the single fish or the fish school received from the directivity correction unit 20 by as much as the amount of displacement Δh calculated by the heave amount calculator 23. Even when the beam vector is directed vertically downward and the vessel is heaving due to waves, for instance, the beam vector direction can be maintained vertically downward by correcting the same by the pitch angle $\phi_P$ and the roll angle $\phi_R$. The echo sounder of the present invention can make the above-described correction in this way with much higher accuracy than the earlier-mentioned approach of Japanese Patent Application Publication No. 1993-19053. Provided that the beam vector makes an angle β with the direction vertically down, the heave correction processor 21 makes the aforementioned correction by using Δh and β. Data on the corrected position and the length of the single fish, or the corrected position and quantity of the fish school, are finally sent to a display unit 22 for on-screen presentation. For example, if an operator clicks a mark representing a single fish displayed on the display unit 22 by means of a mouse, the echo sounder displays the corrected position of the single fish and the length thereof on the display unit 22.

The invention has thus far been described with reference to the specific embodiment in which the target strength TS is corrected by the transmit directivity aperture area correction factor Ct and the receive directivity aperture area correction factor Cr. In one alternative, the above-described arrangement of the embodiment may be so modified as to calculate the aperture area of the transducer 2 as viewed along the beam vector direction by using the pitch angle $\phi_P$ and the roll angle $\phi_R$ detected by the motion sensing device 8 and to increase or decrease the number of vibrating elements 3 used for transmitting acoustic waves such that the aperture area (first aperture area) of the transducer 2 in transmit cycles has a fixed value. Specifically, the number of vibrating elements 3 used for transmission is decreased (by prohibiting transmission from those vibrating elements 3, such as the 12th and 13th vibrating elements 3, which are located in a peripheral area of the transducer 2) when the aperture area is large, and the number of vibrating elements 3 used for transmission is increased when the aperture area is small.

Likewise, the number of vibrating elements 3 used for receiving echo signals may be increased or decreased (in other words, the number of channels used for forming the receiving beam may be increased or decreased) such that the aperture area (second aperture area) of the transducer 2 in receive cycles as viewed along the beam vector direction has a fixed value. In this case, the first and second aperture areas should preferably be made equal to each other. With this arrangement, the aperture area of the transducer 2 as viewed along the beam vector direction is made constant, and the spreading of the transmitting and receiving beams and the signal level achieved thereby remain stabilized even when the vessel is in motion (pitches, rolls or heaves). Therefore, this alternative arrangement provides the same advantageous effects as achieved by the arrangement of the aforementioned embodiment in which the target strength TS is corrected by the transmit directivity aperture area correction factor Ct and the receive directivity aperture area correction factor Cr. In this alternative form of the embodiment, calculation and control operation mentioned above are performed by the control unit 1.

Figure 9:
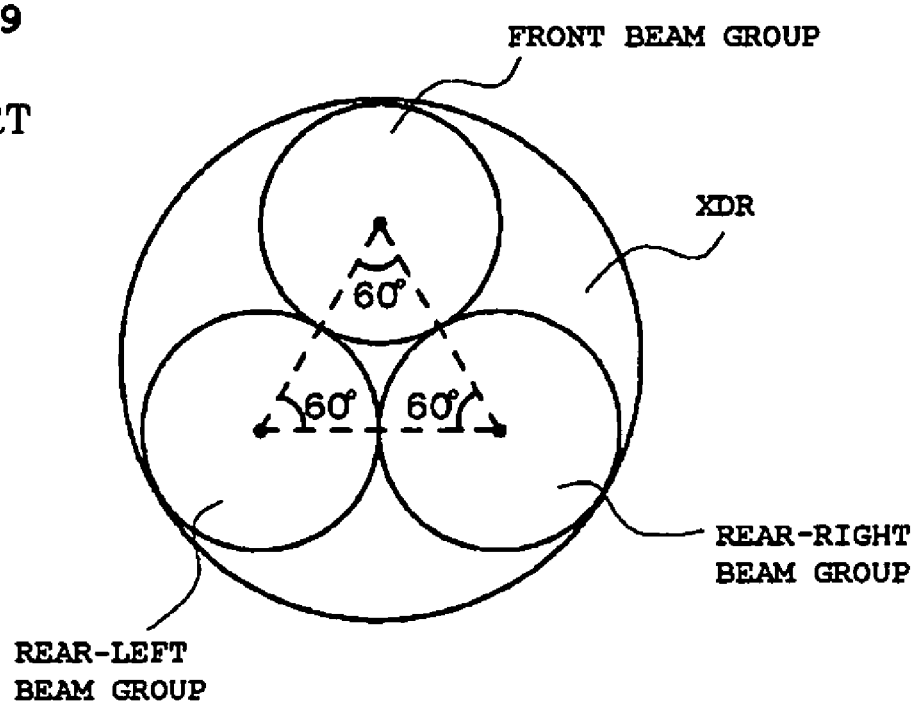
FIG. 9 is a diagram showing a transducer of another conventional split-beam type quantitative echo sounder.

In the foregoing discussion of the embodiment, the vibrating elements 3 of the transducer 2 are divided into four groups and the echo signal incidence angle ($\theta_{XZ}$, $\theta_{YZ}$) is determined from the phase differences ($\alpha_{BF}$, $\alpha_{RL}$) between the receiving beam signals picked up by the front and rear group vibrating elements 3 and the left and right group vibrating elements 3. According to the invention, this arrangement of the embodiment may be modified such that the vibrating elements 3 of the transducer 2 are divided into three groups as shown in FIG. 9 and the echo sounder determines the echo signal incidence angle from phase differences among receiving beam signals picked up by the vibrating elements 3 of the three groups. Since the centers of gravity of the three vibrating element groups are not in line, it is possible to mathematically determine the echo signal incidence angle from the phase differences among the receiving beam signals picked up by the vibrating elements 3 of the three groups in this alternative arrangement. Also, instead of dividing the vibrating elements 3 into the front, rear-left and rear-right beam groups illustrated in FIG. 9, the vibrating elements 3 may be divided into front-left, front-right and rear beam groups.

In the foregoing discussion of the embodiment, the vibrating elements 3 of the transducer 2 are divided into four groups FR, FL, RL, RR and combinations of two of these vibrating element groups constitute front, rear, left and right vibrating element groups, wherein the echo signal incidence angle is determined from the phase differences between the receiving beam signals picked up by the front and rear group vibrating elements 3 and the left and right group vibrating elements 3. According to the invention, this arrangement of the embodiment may be so modified as to calculate the echo signal incidence angle ($\theta_{XZ}$, $\theta_{YZ}$) from the phase differences between the receiving beam signals picked up by the front-left vibrating element group FL and the rear-right vibrating element group RR and the phase differences between the receiving beam signals picked up by the front-right vibrating element group FR and the rear-left vibrating element group RL. Furthermore, the number of vibrating element groups is not limited to four but the above-described arrangement of the embodiment may be modified such that the vibrating elements 3 of the transducer 2 is divided into five or more groups and the echo signal incidence angle is determined from phase differences between receiving beam signals picked up by different groups of the vibrating elements 3. Specifically, the echo signal incidence angle can be determined from phase differences between receiving beam signals configured from echo signals received by one, two or more vibrating element groups.

Furthermore, although the echo signal level LV is generated from the echo signals received by all the channels in the foregoing embodiment, the above-described arrangement of the embodiment may be modified such that the echo signals received by those vibrating elements 3, such as the 13th, 26th, 29th and 52th vibrating elements 3, which are located in peripheral areas of the transducer 2 are excluded from calculation of the echo signal level LV.

Furthermore, although the directivity correction unit 20 calculates the target strength TS of a single fish using the data obtained by the operation for separating, or extracting, the single fish data performed by the single target separator 19, the above-described arrangement of the embodiment may be modified such that the data output from the beamforming circuit 12 is stored in the memory of the control unit 1 and the CPU of the control unit 1 performs single fish separating operation on the stored data and calculates the target strength TS of a single fish. In addition, the CPU of the control unit 1 may perform part of mathematical operation performed by the delay circuits 6 and the phase correction circuits 11.

Furthermore, although the transmit signal is a sine-wave signal having a specific frequency in the foregoing embodiment, the transmit signal may be a signal frequency-modulated by a sine wave such that the frequency of the sine-wave transmit signal continuously increases from f1 to f2, or the frequency of the sine-wave transmit signal continuously decreases from f2 to f1. As the frequency of the transmit signal continuously varies in this modification of the embodiment, it is not possible to perform the same IQ sampling as described earlier in its strict sense. It is however possible to perform a sort of IQ sampling which is by no means inconvenient from a practical point of view and is one form of the invention.

Moreover, although the invention has thus far been described with reference to the split-beam type quantitative echo sounder in which corrections are made for the vessel's motion to carry out precise quantitative echo sounding, the invention is also applicable to an underwater sounding apparatus (such as a scanning sonar) employing a cylindrical transducer unit provided with a large number of vibrating elements arranged on a cylindrical side surface of the transducer unit to form an umbrella-shaped transmitting beam and a rotating receiving beam directed underwater in all directions around the transducer unit and obtain underwater information by analyzing returning echo signals. The underwater sounding apparatus thus structured is given a capability to maintain the transmitting and receiving beams in a desired direction even under conditions where the vessel pitches, rolls or heaves according to the invention.

What is claimed is:

1. A split-beam type quantitative echo sounder having a capability to correct a measured target strength of an object by the angle of incidence of echo signals returned by said object, said quantitative echo sounder comprising:

a transducer having a plurality of vibrating elements for radiating acoustic waves, the vibrating elements being arranged close to one another on a flat plane and divided at least into three groups, the centers of gravity of the three vibrating element groups being located not in line;

a transmit signal regulator for matching the direction of an acoustic axis of a transmitting beam with a predetermined sounding direction by adjusting transmission start timing or phases of the acoustic waves radiated by the individual vibrating elements based on pitch and roll angles measured at a moment of transmission start and the positions of the individual vibrating elements on the transducer;

a received signal regulator for matching the direction of an acoustic axis of a receiving beam with said sounding direction by adjusting phases of the echo signals received by the individual vibrating elements based on pitch and roll angles measured at a moment of receiving the echo signals and the positions of the individual vibrating elements on the transducer;

an incidence angle calculator for calculating the angle of incidence of the echo signals with respect to said sounding direction from phase differences between receiving beam signals formed from the phase-adjusted received echo signals obtained by at least one vibrating element group; and a first target strength corrector for correcting the measured target strength of said object based on the calculated incidence angle of the received echo signals.

2. The quantitative echo sounder according to claim 1 further comprising a second target strength corrector which calculates a first angle that the normal to a transmit-receive surface of said transducer makes with said sounding direction by using the pitch and roll angles measured at the moment of transmission start, calculates a second angle that the normal to the transmit-receive surface of said transducer makes with said sounding direction by using the pitch and roll angles measured at the moment of receiving the echo signals, and corrects said target strength based on said first and second angles.

3. The quantitative echo sounder according to claim 1 further comprising means for calculating a first aperture area of the transmit-receive surface of said transducer as viewed along said sounding direction by using the pitch and roll angles measured at the moment of transmission start, varying the number of vibrating elements used for transmitting the acoustic waves in a manner that said first aperture area has a fixed value, calculating a second aperture area of the transmit-receive surface of said transducer as viewed along said sounding direction by using the pitch and roll angles measured at the moment of receiving the echo signals, and varying the number of vibrating elements used for receiving the echo signals in a manner that said second aperture area has a fixed value.

4. The quantitative echo sounder according to one of claims 1 to 3, wherein the amount of adjustment of the transmission start timing or the phases of the acoustic waves and the amount of adjustment of the phases of the received echo signals are calculated from the scalar product of a vector indicating said sounding direction and position vectors of the individual vibrating elements corrected by the pitch and roll angles.

5. The quantitative echo sounder according to one of claims 1 to 3 further comprising:

a display unit for displaying the location of said object detected; and means for determining the amount of displacement of said transducer from a reference position thereof in a vertical direction;

wherein the location of said object along the vertical direction displayed on said display unit is corrected by the determined amount of displacement of said transducer.

6. The quantitative echo sounder according to one of claims 1 to 3 further comprising means for varying said sounding direction which is a vertically downward direction or a direction inclined from the vertically downward direction by a specific angle.

7. The quantitative echo sounder according to claim 6 further comprising:

a display unit for displaying the location of said object detected; and means for determining the amount of displacement of said transducer from a reference position thereof in a vertical direction;

wherein the location of said object along the vertical direction displayed on said display unit is corrected by the determined amount of displacement of said transducer and said specific angle that said sounding direction makes with the vertically downward direction.

8. A method of split-beam type quantitative fish echo sounding by use of a transducer having a plurality of vibrating elements for radiating acoustic waves, the vibrating elements being arranged close to one another on a flat plane and divided at least into three groups, the centers of gravity of the three vibrating element groups being located not in line, in which a measured target strength of an object is corrected by the angle of incidence of echo signals returned by said object, said method comprising:

matching the direction of an acoustic axis of a transmitting beam with a predetermined sounding direction by adjusting transmission start timing or phases of the acoustic waves radiated by the individual vibrating elements based on pitch and roll angles measured at a moment of transmission start and the positions of the individual vibrating elements on the transducer;

matching the direction of an acoustic axis of a receiving beam with said sounding direction by adjusting phases of the echo signals received by the individual vibrating elements based on pitch and roll angles measured at a moment of receiving the echo signals and the positions of the individual vibrating elements on the transducer;

calculating the angle of incidence of the echo signals with respect to said sounding direction from phase differences between receiving beam signals formed from the phase-adjusted received echo signals obtained by at least one vibrating element group; and correcting the measured target strength of said object based on the calculated incidence angle of the received echo signals.

9. A split-beam type quantitative echo sounder comprising:

a transducer having a plurality of vibrating elements for radiating acoustic waves;

a transmit signal regulator for matching the direction of an acoustic axis of a transmitting beam with a predetermined sounding direction based on pitch and roll angles measured at a moment of transmission start; and a received signal regulator for matching the direction of an acoustic axis of a receiving beam with said sounding direction based on pitch and roll angles measured at a moment of receiving echo signals.

* * * * *